Patented Oct. 28, 1941

2,260,642

UNITED STATES PATENT OFFICE 2,260,642

DIARALKYL CYANAMIDES

Richard O. Roblin, Jr., Stamford, Conn., assignor to American Cyanamid Company, New York, N. Y., a corporation of Maine No Drawing. Application May 23, 1939, Serial No. 275,224

3 Claims. (Cl. 260—551)

This invention relates to new disubstituted cyanamide compounds of the formula—

where R and R' represent aralkyl or substituted aralkyl radicals having a total of more than fourteen carbon atoms.

These compounds may be generally prepared in an inert solvent such as benzene or petroleum ether fractions by the reaction between the corresponding secondary amine, cyanogen chloride and caustic soda. A preferred equation for this reaction is as follows:

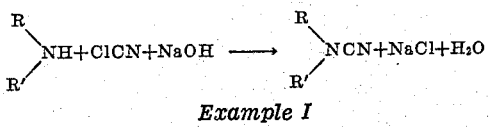

Example I 6.1 grams of cyanogen chloride are dissolved in 100 cc. of heptane. After cooling the solution to 0°–5° C., 29.7 grams of di-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is recrystallized from alcohol and the product identified as di-1-naphthylmethyl cyanamide.

Example II 6.1 grams of cyanogen chloride are dissolved in 150 cc. of benzene. After cooling the solution to 0°–5° C., 38.7 grams of di-5-nitro-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is recrystallized from alcohol and the product identified as di-5-nitro-1-naphthylmethyl cyanamide.

Similarly other disubstituted cyanamides of the above class may be prepared utilizing the corresponding secondary amine.

It is to be understood that the above examples are illustrative only.

These new compounds are adapted for various uses, more particularly as intermediates, insecticides and plasticizers for natural and synthetic resins.

While the invention has been described with particular reference to specific embodiments, it is to be understood that it is not to be limited thereto but is to be construed broadly and restricted solely by the scope of the appended claims.

I claim:

1. As a new compound, the disubstituted cyanamide of the formula—

where the Rs are chosen from the group consisting of 1-naphthylmethyl and 5-nitro-1-naphthylmethyl radicals.

2. As a new compound, di-1-naphthylmethyl cyanamide.

3. As a new compound, di-5-nitro-1-naphthylmethyl cyanamide.

RICHARD O. ROBLIN, JR.